US009775463B2

(12) United States Patent
Jarisch et al.

(10) Patent No.: US 9,775,463 B2
(45) Date of Patent: Oct. 3, 2017

(54) DEVICE FOR PREPARING A BEVERAGE BY CENTRIFUGATION

(71) Applicant: Nestec S.A., Vevey (CH)

(72) Inventors: Christian Jarisch, Lutry (CH); Zbynek Struzka, Montreal Quebec (CA); Stefan Etter, Kehrsatz (CH); Alexandre Perentes, Lausanne (CH)

(73) Assignee: Nestec S. A., Vevey (CH)

( * ) Notice: Subject to any disclaimer, the term of this patent is extended or adjusted under 35 U.S.C. 154(b) by 0 days.

(21) Appl. No.: 14/650,528

(22) PCT Filed: Dec. 6, 2013

(86) PCT No.: PCT/EP2013/075741
§ 371 (c)(1),
(2) Date: Jun. 8, 2015

(87) PCT Pub. No.: WO2014/102048
PCT Pub. Date: Jul. 3, 2014

(65) Prior Publication Data
US 2015/0335193 A1    Nov. 26, 2015

(30) Foreign Application Priority Data
Dec. 6, 2012   (EP) ..................................... 12195801

(51) Int. Cl.
*A47J 31/22*   (2006.01)
*A23F 5/26*    (2006.01)

(52) U.S. Cl.
CPC .................. *A47J 31/22* (2013.01); *A23F 5/26* (2013.01)

(58) Field of Classification Search
CPC ...... A47J 31/22; A47J 31/407; B65D 85/8043
USPC ................ 99/302 C, 295, 287; 426/431, 433
See application file for complete search history.

(56) References Cited

U.S. PATENT DOCUMENTS

| 4,074,621 | A  | * | 2/1978  | Cailliot  | A47J 31/22 99/286 |
| 4,204,964 | A  | * | 5/1980  | Cailliot  | B04B 3/08 210/370 |
| 4,962,693 | A  | * | 10/1990 | Miwa      | A47J 31/42 99/283 |
| 8,919,242 | B2 | * | 12/2014 | Perentes  | A47J 31/0673 426/425 |
| 9,226,611 | B2 | * | 1/2016  | Yoakim    | A47J 31/22 |
| 2003/0052206 | A1 | * | 3/2003 | Fouquet  | A47J 43/085 241/92 |

(Continued)

FOREIGN PATENT DOCUMENTS

| CH | WO 2012007293 A1 * | 1/2012 | ............. A47J 31/22 |
| WO |   2006112691 A1     | 10/2006 | |

(Continued)

OTHER PUBLICATIONS

International Search Report, mailed Jan. 15, 2014, in PCT/EP2013/075741, filed Dec. 6, 2013.

(Continued)

*Primary Examiner* — David Angwin
*Assistant Examiner* — Lawrence Samuels
(74) *Attorney, Agent, or Firm* — Dunlap Codding, P.C.

(57) ABSTRACT

A device for preparing a beverage from a beverage ingredient contained in a receptacle by driving the receptacle in centrifugation is disclosed, along with methods for using same.

15 Claims, 6 Drawing Sheets

(56) References Cited

U.S. PATENT DOCUMENTS

| | | | | |
|---|---|---|---|---|
| 2010/0173056 A1* | 7/2010 | Yoakim | ............... | A47J 31/22 |
| | | | | 426/433 |
| 2010/0178404 A1* | 7/2010 | Yoakim | ............... | A47J 31/22 |
| | | | | 426/431 |
| 2011/0217421 A1* | 9/2011 | Perentes | ............. | A47J 31/22 |
| | | | | 426/80 |
| 2011/0244099 A1* | 10/2011 | Perentes | ......... | A47J 31/3695 |
| | | | | 426/431 |
| 2011/0293805 A1* | 12/2011 | Perentes | ............. | A47J 31/22 |
| | | | | 426/433 |
| 2013/0206014 A1* | 8/2013 | Jarisch | ............. | A47J 31/407 |
| | | | | 99/295 |

FOREIGN PATENT DOCUMENTS

| | | |
|---|---|---|
| WO | 2008148601 A1 | 12/2008 |
| WO | 2008148646 A1 | 12/2008 |
| WO | 2008148834 A1 | 12/2008 |
| WO | 2012007293 A1 | 1/2012 |

OTHER PUBLICATIONS

Written Opinion of the International Search Report, mailed Jan. 15, 2014, in PCT/EP2013/075741, filed Dec. 6, 2013.

\* cited by examiner

DEVICE FOR PREPARING A BEVERAGE BY CENTRIFUGATION

CROSS REFERENCE TO RELATED APPLICATIONS/INCORPORATION BY REFERENCE STATEMENT

This application is a US national stage application filed under 35 USC §371 of International Application No. PCT/EP2013/075741, filed Dec. 6, 2013; which claims benefit of EP Application No. 12195801.1, filed Dec. 6, 2012. The entire contents of the above-referenced applications are hereby expressly incorporated herein by reference.

FIELD OF THE INVENTIVE CONCEPT(S)

The presently disclosed and/or claimed inventive concept(s) relates to the field of the preparation of a beverage by centrifugation. In particular, it relates to a device and a method for preparing a beverage such as coffee by using centrifugation to brew and extract the beverage from a receptacle.

BACKGROUND

The preparation of a beverage by using centrifugation is known. The principle mainly consists in providing a beverage ingredient in a receptacle, feeding liquid in the receptacle and rotating the receptacle at elevated speed to ensure interaction of the liquid with the powder while creating a gradient of pressure of liquid in the receptacle; such pressure increasing gradually from the centre towards the periphery of the receptacle. As liquid traverses the coffee bed, extraction of the coffee compounds takes place and a liquid extract is obtained that flows out at the periphery of the receptacle.

WO 2008/148601 describes a possible example of a device using such principle wherein the receptacle is a sealed capsule which is opened before its use. Hot water is fed in the centre of the capsule via a water interfacing part comprising a water injector aligned in the rotation axis. The receptacle is held in a capsule holder which is rotated by means of a rotary motor. Both the liquid interfacing part and the capsule holding part are mounted along roller bearings. The beverage is extracted from the capsule by a plurality of peripheral needles that creates openings through a lid of the receptacle. As the capsule is centrifuged about its rotation axis, hot water passes through the beverage ingredient, interacts with it to produce a liquid extract and the resulting liquid extract traverses, under the effect of the centrifugal forces, the peripheral openings and is projected against an impact wall of the collector. The liquid extract, thus constituting the beverage, is then drained through a beverage duct of the device and collected into a recipient such as a cup.

WO 2008/148646 and WO 2008/148650 further describe a beverage preparation device wherein a flow restriction is created downstream of the receptacle, in particular a capsule, for example, by a valve system which opens or enlarges under the pressure created by the centrifuged liquid leaving the receptacle. The valve system can be formed by a mobile restriction part of the device which is elastically urged against a rim portion of the capsule.

U.S. Pat. No. 5,566,605 relates to a centrifugal type extraction cell having a deformable sealing joint for hot beverage preparation machine. The cell comprises a drum and a cover defining with the drum an internal volume. The cover is connected to the drum by attachment ears that engage in ramps.

US 2003/0052206 A1 relates to a device for driving tool for a food-processing apparatus. The apparatus processes the food placed in it, particularly pressing, cutting, grating or slicing. It relates in particular to a juice extractor for fruit and vegetables or to a citrus-fruit squeezer, a grater or a vegetable-cutting disc. The device comprises a basket connected to a base part. The base part is mounted around a drive head. The connection between the base part and the drive head is obtained by at least two studs of the head which can be moved under the centrifugal forces towards a peripheral reinforcement of the base part. An annular elastic membrane is also provided to return the studs towards their withdrawn position when no centrifugal force is involved. However, presently disclosed and/or claimed inventive concept(s) simply deals with the rapid connection of a rotary tool, more specifically, a fruit or vegetable extracting basket onto a drive head. In particular, the basket is essentially open and is not engaged by a liquid interfacing part. In particular, there is no pressure of centrifuged liquid (e.g., fruit juice) involved which acts directly or indirectly on the connection of the rotating parts.

U.S. Pat. No. 4,700,621 also relates to a quick/disconnect coupling for high speed appliance such as juice extractor wherein a basket is positively connected for rotation and axially latched to a drive assembly without mechanical adjustment.

In the prior art beverage preparation devices, the water interfacing part which supplies the receptacle with water and the holding part which holds the receptacle are rotatable along frame portions of the device which are secured together by a closure mechanism such as a bayonet system or the like. The holding part is generally mounted on a frame part via at least one roller bearing. The liquid interfacing part is also generally part of a frame part also mounted along at least one roller bearing. When the device is rotated at high speed during centrifugation, the pressure of the liquid extract creates important axial and radial forces on the rotating parts which tend to separate these rotating parts.

WO 2012/007293 A1 relates to a beverage preparation device providing a closure in which radially and translationally moveable pins are provided in a closure member of the device which are biased towards and engaged in a groove provided in a capsule holder upon pressure of a spring means when closing the device. Upon rotation of the device, the engagement between the pins and the groove and thus the connection between the closure member and the capsule holder increases as a result of the increase of the centrifugal forces. However, due to the translational movement of the pins, high friction forces must be overcome to let the pins slide. This can be achieved by increasing the mass of inertia thus increasing the pins which also has the effect of a total increase of the dimensions of the device. Making the device more robust also impacts on the costs of the device. Furthermore, as the pins are biased towards a position of closing the device, an escape of gases from the capsule may be hindered by the engagement in closure of the closure member on the capsule holder, during the supply of water in the capsule, i.e. during a so-called pre-wetting step.

The presently disclosed and/or claimed inventive concept(s) aims at solving the above-mentioned problems.

BRIEF DESCRIPTION OF THE DRAWINGS

Additional features, advantages and objects of the presently disclosed and/or claimed inventive concept(s) will become apparent in light of the following detailed description of the particular, non-limiting embodiments, when taken in conjunction with the figures of the enclosed drawings.

FIG. 5b shows a perspective side view of the liquid interfacing part of FIG. 5a.

FIG. 5c shows a perspective top view of the liquid interfacing part of FIG. 5a.

Figure 1:
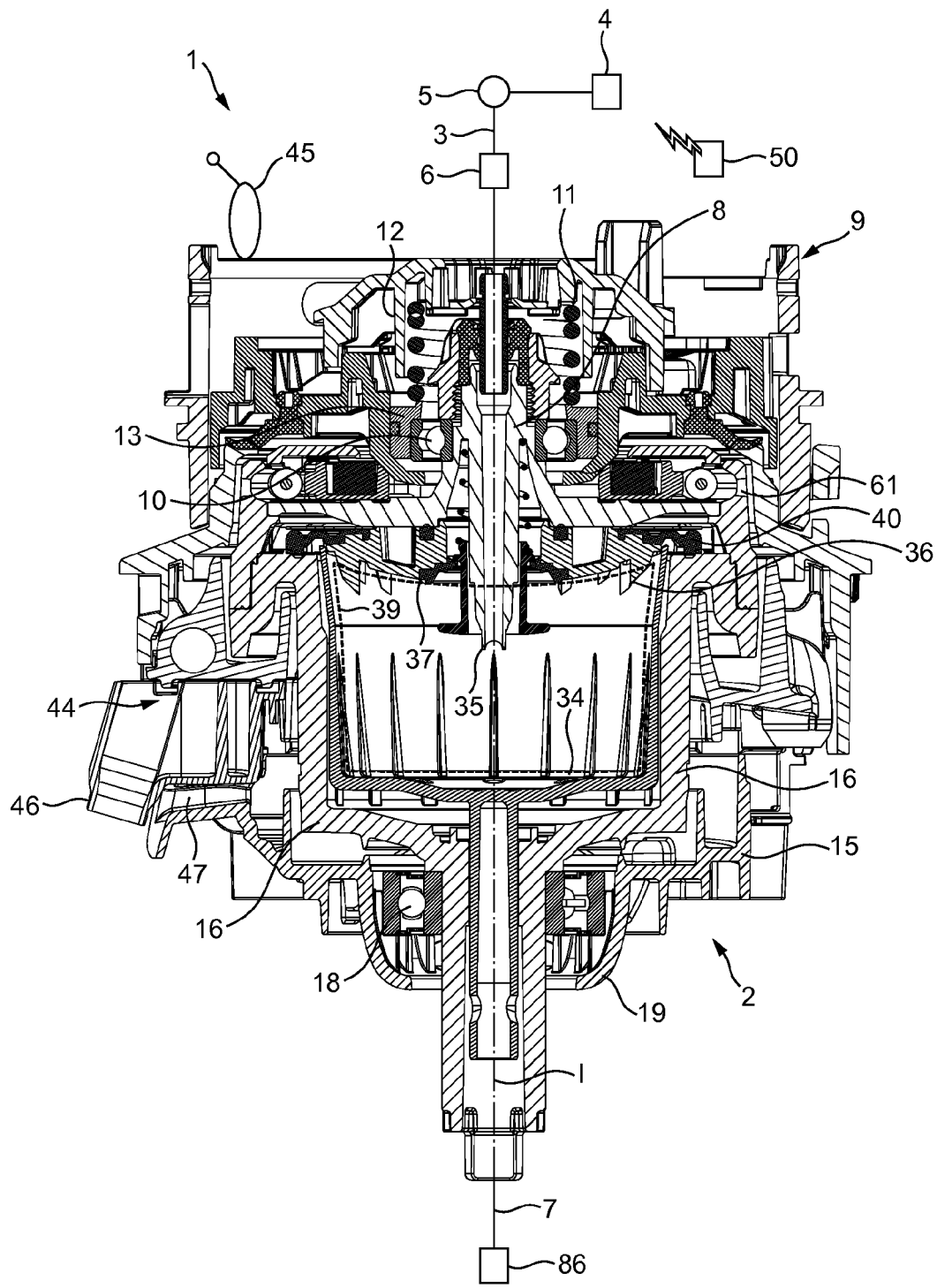
FIG. 1 shows a device of the presently disclosed and/or claimed inventive concept(s) in static state of the brewing unit, e.g. when supplying water into the receptacle.

A particular, non-limiting embodiment is now described in relation to FIGS. 1 to 6 as a matter of example.

DETAILED DESCRIPTION

For this, the presently disclosed and/or claimed inventive concept(s) relates to a device according to claim 1 and a method according to claim 14. The dependent claims further develop the presently disclosed and/or claimed inventive concept(s).

In particular, the presently disclosed and/or claimed inventive concept(s) relates to a device for preparing a beverage from a beverage ingredient contained in a receptacle by driving the receptacle in centrifugation comprising:
  a holding part arranged for holding the receptacle in a position enabling it to be driven in rotation along a longitudinal axis of rotation,
  a liquid interfacing part arranged for engaging against the receptacle and for supplying water in the receptacle and/or extracting the beverage from the receptacle, a collecting part for collecting the beverage obtained by the interaction between the ingredient and water in the receptacle,
wherein the holding part and the liquid interfacing part are connected together by connection means at least during rotation or centrifugation in such a manner that these parts rotate together with the receptacle during, centrifugation, wherein the connection means comprises at least a first engaging surface of one of the holding part or the liquid interfacing part and a second engaging surface of a locking means connected to the other one of the holding part or the liquid interfacing part which are adapted to be engaged in contact together at least during rotation of the device in a manner preventing the holding part and the liquid interfacing part from moving away from each other, at least in the axial direction of rotation, and wherein the locking means of the connection means is arranged to be moveably connected to the other one of the parts with at least one degree of freedom at least about a pivoting axis (in a particular, non-limiting embodiment) being substantially in parallel to the longitudinal axis of rotation for enabling the engagement forces to increase between the two engaging surfaces as a result of the increase of the centrifugal forces.

Therefore, contrary to the prior devices, the device of the presently disclosed and/or claimed inventive concept(s) provides a closure connection between the key rotational parts of the device which becomes stronger by the effect of the centrifugal forces while a pivoted guidance of the locking means results in less friction and also less impact of dirt in comparison with a linearly moveable locking pin which must be guided along its whole circumference.

In particular, the device is arranged such that the receptacle is held between the holding part and the liquid interfacing part. The liquid interfacing part is arranged for engaging against the receptacle when the receptacle is held in the holding part. The liquid interfacing part is thereby submitted to a gradient of liquid pressure in the receptacle at least during rotation of the device, i.e. during centrifugation. Since only minimal frictional forces are to be overcome due to the pivotal arrangement of the locking means, the presently disclosed and/or claimed inventive concept(s) therefore ensures that the connection resists to such pressure and that the liquid interfacing part remains in engagement with the receptacle during the beverage extraction with the aid of a comparably small locking means requiring a smaller torque and thus resulting in increased engagement forces.

In a particular, non-limiting embodiment, a discharge opening is provided in the device for allowing gases in the receptacle to escape through said opening when supplying water in the receptacle, and wherein the first engaging surface and the second engaging surface are not engaged in a static state of the device at least when supplying water in the receptacle. As the first and second engaging surfaces are not engaged during a supply of water in the receptacle, one of the parts, e.g., the liquid interfacing part, can be easily lifted due to the (liquid) pressure increase within the receptacle so that the gases which are initially trapped within the receptacle can easily escape via the discharge opening(s).

The presently disclosed and/or claimed inventive concept(s) also relates to a device for preparing a beverage from a beverage ingredient contained in a receptacle by driving the receptacle in centrifugation comprising:
  a holding part arranged for holding the receptacle in a position enabling it to be driven in rotation along a longitudinal axis of rotation,
  a liquid interfacing part arranged for engaging against the receptacle and for supplying water in the receptacle and/or extracting the beverage from the receptacle,
  a collecting part for collecting the beverage obtained by the interaction between the ingredient and water in the receptacle,
wherein a discharge opening is provided in the device for allowing gases in the receptacle to escape through said opening when supplying water in the receptacle,
wherein the holding part and the liquid interfacing part are connected together by connection means at least during rotation in such a manner that these parts rotate together with the receptacle during centrifugation,
wherein the connection means comprises at least a first engaging surface of one of the holding part or the liquid interfacing part and a second engaging surface of a locking means of the other one of the holding part or the liquid interfacing part which are not engaged in a static state of the device at least when supplying water in the receptacle and are adapted to be engaged in contact together during rotation of the device in a manner preventing the holding part and the liquid interfacing part from moving away from each other, at least in the axial direction of rotation, and
wherein the locking means of the connection means is arranged to be moveably connected to the other one of the parts with at least one degree of freedom for enabling the engagement forces to increase between the two engaging surfaces as a result of the increase of the centrifugal forces.

It has already been stated above that, as the first and second engaging surfaces are not engaged during a supply of water in the receptacle, one of the parts, e.g., the liquid interfacing part, can be easily lifted due to the (liquid) pressure increase within the receptacle so that the gases which are initially trapped within the receptacle can easily escape via the thus created discharge opening(s) so that the beverage ingredients can sufficiently interact with water (e.g., be sufficiently wetted).

In general, the locking means of the connection means is arranged to be moveably connected to the other one of the parts with at least one degree of freedom at least about a pivoting axis (in a particular, non-limiting embodiment) being substantially in parallel to the longitudinal axis of rotation, thus reducing the frictional forces of the locking means in the device.

The locking means may comprise a dedicated mass element which is (in a particular, non-limiting embodiment) separately mounted on the locking means. By means of a separate, dedicated mass element, the respective engagement force can be adapted in line with the required production parameters; e.g. the rotational speed and the like. Hence, an optimal mass can be used thus reducing the wear of the device or at least increasing the force of the centrifugal mass. The mass element is (in a particular, non-limiting embodiment) made of a high density material such as metal, e.g. a steel bar, or the like. For instance, the pin can also be made of copper, brass, lead and so on. The mass is (in a particular, non-limiting embodiment) mounted in a pivoting frame of the locking means.

The engaging surfaces of the two parts of the device are such that they extend at least in a direction of the parts which is inclined or curved relative to the axial direction of rotation. As a result, the centrifugal forces generate a component of forces in the axial direction which applies on the engaging surfaces to increase the connection between the parts during the centrifugal operations.

The second engaging surface is provided by a rotatably mounted member, for example (but not by way of limitation) a roller, which (in a particular, non-limiting embodiment) has a rotational axis being orthogonally arranged with respect to the longitudinal axis of rotation. Hence, the second engaging surface being provided as a roller can be easily engaged with the first engaging surface at least during centrifugation thus reducing the friction in the second engaging surface (e.g. a groove), of the respective device part. For a secure engagement of the engaging surfaces, the first engaging surface is a circumferential groove in the respective one of the holding part or the liquid interfacing part, with which the second engaging surface of the locking means engages at least during centrifugation. In a very particular but non-limiting embodiment, the roller is part of the locking means.

In general, the liquid interfacing part may comprise means for injecting liquid in the centre of the receptacle. In particular, the liquid injecting means can be formed by a hollow needle that perforates a lid of the receptacle or penetrates through an inlet formed in the lid of the receptacle. The liquid injecting means may also be a nozzle that fits around an inlet of the receptacle.

The liquid interfacing part may also comprise means for extracting the beverage from the receptacle. The beverage extracting means may comprise a series of perforating members for perforating outlet openings in an upper wall of the receptacle. The perforating members can be small conical or pyramidal members distributed along a circular pattern of the liquid interfacing part. These members may provide perforations through a lid of the receptacle. The lid may be a gastight membrane, a porous membrane, a web, a filter paper or combinations thereof. Possibly, a part of the thickness of the lid may resist to the perforation by the members. However, it should be noticed that the perforating means are not mandatory for the core of the presently disclosed and/or claimed inventive concept(s), in particular, when the receptacle is already pre-perforated or porous.

For controlling the centrifugal pressure created by the liquid extract in the receptacle, the device comprises a flow restriction valve comprising a pressing portion engaging with a rim portion of the receptacle. Such valve means and its function are, for example, described in WO 2008/148646. The function of the valve is essentially to provide a back-pressure which enables to control the residence time of liquid in the receptacle and to control the flow rate of the centrifuged liquid leaving the receptacle.

The pressing portion of the device (in a particular, non-limiting embodiment) engages with a rim portion of the receptacle under the load of an elastic biasing means, wherein during centrifugation, the pressing portion of the liquid interfacing part is moved away from the rim portion of the receptacle by the pressure created by the centrifuged beverage on the valve, when a sufficient rotational speed has been reached, so as to create at least one flow passage between the pressing portion and the rim portion of the receptacle. The receptacle may be selected amongst ones having a rim portion of particular thickness so that the opening of valve is determined by the elastic force of the elastic biasing means and the pre-constraint that is set by the selected thickness of the rim portion when engaged against the pressing portion. Typically, the greater the thickness, the greater the pre-constraint on the valve means and the greater the rotational speed is necessary for a given flow rate.

In a possible mode, the connection means are located above the receptacle. In such mode, the holding part may comprise radial through-openings positioned substantially at the same level as the rim portion of the receptacle for allowing the centrifuged liquid to traverse the holding part before it impacts on a wall of the collecting part surrounding the holding part.

The device further comprises a closure actuation mechanism to operate the closure of the liquid interfacing part and the holding part in guiding and moving at least one of the said parts relative to the other from an opening position in which the parts are sufficiently distant one another to allow the receptacle to be placed in the holding part to a closure position in which the engagement of the connection means is generally possible during centrifugation or rotation of the device. The closure actuation means are also arranged to carry out the opening of the part for enabling the receptacle to be removed from the device. Such closure actuation mechanism can be a cam system, a rotary bayonet-like closure system or a knee-joint means or an hydraulic means or a motorized spindle-type mechanism a combination of these systems. In particular, a suitable closure system is described in co-pending European patent application No. 12194801.2.

The receptacle is (in a particular, non-limiting embodiment) a capsule containing a dose of a beverage ingredient. The capsule may comprise a cup-shaped body comprising a widening sidewall, a rim portion protruding outwardly and a lid covering said body. The rim portion is designed to be inserted between the capsule holding part and liquid interfacing part. In particular, the rim portion is engaged by a pressing portion of the restriction valve of the liquid interfacing part, on one side, and is held on the holding part, on the other side.

The term "capsule" refers to any flexible, rigid or semi-rigid container containing a beverage ingredient. The capsule is separable from the device of the presently disclosed and/or claimed inventive concept(s) and is typically discarded after its use in the device (e.g., recycled, composted or incinerated). Other synonymous to a capsule are: "pod", "pad", "cartridge" or "sachet". The capsule can be single use. The receptacle can also be filled with ingredients by the user to prepare a capsule just before use.

The beverage ingredients can be any suitable food or beverage ingredient that provides a beverage or liquid food when interacting with a liquid, in particular, hot water. In particular, the beverage ingredients are chosen amongst the group consisting of: roast and ground coffee, soluble coffee, green coffee, leaf tea, soluble tea, herbal tea, chicories, cocoa, milk, soup powder, infant formula and combinations thereof. In a particular, non-limiting embodiment, the beverage ingredients are essentially roast and ground coffee powder.

The presently disclosed and/or claimed inventive concept(s) also relates to a method for preparing a beverage from a beverage ingredient contained in a receptacle, comprising the steps of:

placing the receptacle in a holding part,
engaging a liquid interfacing part against the receptacle,
supplying water in the receptacle by means of the liquid interfacing part,
driving the receptacle in rotation along a longitudinal axis of rotation by rotating the holding part and the liquid interfacing part together with the receptacle,
collecting the beverage obtained by the interaction between the ingredient and water in the receptacle by a collecting part, wherein the holding part and the liquid interfacing part are connected together by connection means at least during rotation or centrifugation in such a manner that these parts rotate together with the receptacle during centrifugation, wherein the connection means comprises at least a first engaging surface of one of the holding part or the liquid interfacing part and a second engaging surface of a locking means connected to the other one of the holding part or the liquid interfacing part which engage in contact together at least during rotation of the device in a manner preventing the holding part and the liquid interfacing part from moving away from each other, at least in the axial direction of rotation, and
wherein the locking means of the connection means is arranged to be moveably connected to the other one of the parts with at least one degree of freedom at least about a pivoting axis (in a particular, non-limiting embodiment) being substantially in parallel to the longitudinal axis of rotation to increase the engagement forces between the two engaging surfaces as a result of the increase of the centrifugal forces.

In a particular, non-limiting embodiment, during the step of supplying water in the receptacle, the first engaging surface and the second engaging surface are not engaged in said static state of the device and gases under pressure in the receptacle can escape via such as via at least one discharge opening provided in the device. In particular, the supply of water in the receptacle (in a particular, non-limiting embodiment) results in an increase of pressure in the receptacle thus lifting the liquid interfacing part from the holding part to provide a discharge passage for the gases between the receptacle and the discharge opening.

The reference to axial and radial directions is generally made in the present description in relation to the longitudinal axis of rotation of the rotating parts or receptacle. An axial direction refers to a direction aligned or parallel to such axis. A radial direction refers to any possible direction which is perpendicular to said axis.

The device 1 of the presently disclosed and/or claimed inventive concept(s) generally comprises as known 'per se' a centrifugal brewing unit 2 for receiving and centrifuging a receptacle such as a removable capsule 17 (schematically shown in FIG. 4) that will be described in greater detail later on. The centrifugal brewing unit is designed for preparing a beverage such as coffee, from both a beverage ingredient contained in the receptacle and water injected in the receptacle. The injected water thoroughly interacts (such as by brewing or mixing) with the beverage ingredient and, by virtue of the centrifugal forces, a beverage extract is obtained which is forced to leave the receptacle at its periphery. The unit 2 is placed in liquid communication with a liquid supply line 3 intended for supplying a heated liquid, for example (but not by way of limitation) water, from a reservoir 4 to the unit 2. The liquid is circulated through the line 3 by a pump 5. The pump 5 can be of any suitable type such as a piston pump, a diaphragm pump or a peristaltic pump, for example. A heater 6 is provided along the liquid supply line to heat the liquid at a temperature above ambient temperature. The temperature may vary depending on the beverage to be extracted. For instance, for coffee, water can be heated between about 70 and 100 degrees Celsius.

The brewing unit 2 comprises two rotating parts connected together, in particular, a liquid interfacing part 8 and a lower holding part 16. The two parts are designed for holding a receptacle 17, such as a capsule containing a beverage ingredient. The device 1 further comprises a rotational driving means such as a rotary motor 86 which is coupled to one of the rotating parts of the brewing module such as the holding part 16 via a coupling means 7 (not mechanically detailed for a simplification purpose). The rotating parts are arranged in closure, i.e. are connected together by connections means as described herein, along a longitudinal axis of rotation "I" at least during rotation in such a manner that these parts 8, 16 rotate together with the receptacle 17 during centrifugation. It should be noted that the axis of rotation "I" is not necessarily vertical but can be inclined by a certain angle relative to vertical or even horizontal. A control unit 50 is also provided to control the brewing operation, in particular, the rotational speed of the motor 86, the temperature of the liquid provided by the heater 6 and other operations such as the flow rate and amount of liquid supplied by the pump 5.

The liquid interfacing part 8 is supported in an upper frame 9 via a roller bearing assembly and the lower holding part 16 is also supported by a roller bearing assembly. The liquid interfacing part 8 is mounted in the upper frame 9 through a roller bearing 10 and under the force of an elastic biasing means 11 inserted between the frame 9 and the bearing 10. The frame 9 comprises an inner housing 12 of reduced cross-section, which receives a helical spring 11 constituting the elastic biasing means. The spring 11 presses on a ring 13. The external side of the bearing 10 fits into said ring 13. As more particularly visible on FIGS. 5a to 5c, the liquid interfacing part 8 comprises a base plate 14 comprising a central portion designed for engaging through the internal side of the roller bearing 10. The spring 11 acts to compensate for the plays and tolerances and to maintain the parts under pressure during closing of the device in the axial direction and before centrifugation.

On the lower side of the brewing unit 2 is disposed the lower frame 15 for receiving the holding part 16 which is intended to support the capsule 17. The holding part 16 is rotationally mounted through the lower frame 15 by means of a lower roller bearing 18 that fits into a lower housing 19 of reduced cross section of the lower frame 15.

The receptacle or capsule 17 containing a beverage ingredient is arranged between the two rotating parts 8, 16. The capsule 17 is designed and dimensioned for being held by the holding part 16 and being engaged from above by the liquid interfacing part 8. The capsule 17 comprises a body having a bottom 34, a widening side wall 39 which extends outwardly by a rim portion 38. The capsule can have a generally convex without defined edge between the bottom 34 and side wall 39. An upper wall 37 such as a lid covers the body. The lid can be a gastight membrane and/or a porous wall.

The liquid interfacing part 8 comprises an injector 35 designed for supplying (e.g. injecting) a liquid like water in the (center of the) capsule 17. The injector 35 can be formed of a tube traversing the base plate 14 and ending by a perforating tip. On its upper end, the injector 35 is in liquid communication with the liquid supply line 3. Additional liquid control means such as a check valve may be provided upstream the tip. At the periphery of the lower surface of the liquid interfacing part 8 is located a series of beverage extracting means 36 designed to perforate the upper wall 37 of the capsule 17 in multiple zones to provide multiple beverage outlets for finally extracting the beverage from the capsule 17. The peripheral outlets are thus created in the upper wall 37 close to the rim 38 of the capsule 17 where the centrifugal forces are the highest. Alternatively, it could be envisaged to provide outlets on the side wall 39 of the capsule 17 or both on the upper wall 37 and side wall 39 of the capsule 17. The outlets could also be pre-made in the capsule 17 before insertion of the capsule 17 in the device 1. It could also be that the rim 38 is formed as a plurality of outlets for the centrifuged liquid.

A spring-biased capsule tubular extracting member may be positioned coaxially with the injector 35 and in sliding arrangement with it to assist in unsticking the capsule from the lower surface of the interfacing part 8. FIG. 1 shows the extracting member in deployed position (when no capsule is present in the device). Additionally, the interfacing part 8 can be traversed by a few small through-holes to avoid or break the suction effect between the capsule and the surface of the interfacing part 8.

As apparent in FIGS. 1 to 4, a valve means 40 can be further provided such as described in WO 2008/148646 to create a flow restriction or venturi between the rim 38 of the capsule 17 and a spring-biased pressing portion 41 of the liquid interfacing part 8. The portion 41 can be, for instance, a rubber or plastic annular tongue which is mounted in a circumferential recess 42 of the base plate 14. The tongue is urged in the axial direction "I" by means of a spring-biasing element 43. The element 43 can be any suitable spring such as an elastic blade. The valve means 40 is further stressed by the central spring 11. It should be noted that the pressing portion 41 and spring-biasing element 43 could be formed as an integral element. Therefore, the rim 38 of the capsule 17 forms the fixed part of the valve means 40 and the spring-biased pressing portion 41 forms the mobile part which moves away from the rim 38 under the hydraulic pressure of the centrifuged liquid. However, this could also be the opposite. For example, the rim 38 of the capsule 17 could be formed of a portion that is forced to open under the force of an elastic means placed in or below the rim 38. In another alternative, the valve means 40 could be entirely integrated in the capsule 17 such as described in WO 2008/148601.

The holding part 16 comprises a rim's support portion 60 forming a step of the holding part 16 and an upper side wall 29 extending upwards from portion 60. The support portion 60 is configured to firmly support at least a portion of the rim 38 of the capsule 17. One or a plurality of (beverage and/or gas) discharge openings 61 are further provided through the side wall 29. These openings 61 could have different shapes such as circular or oblong. In a particular, non-limiting embodiment, they can be also be elongate slots. In general, the discharge openings 61 should be provided in the device 1 such that gases in the receptacle 17 can escape through said opening(s) 61 when water is supplied/injected in the receptacle 17.

In the frame 15 is also provided a collector 44 for receiving the centrifuged beverage obtained by the interaction between the ingredient and liquid/water in the capsule 17 and leaving the capsule 17 and passing through the valve means 40 and openings 61. The discharge openings for the beverage can be the same openings as the discharge openings 61 for the escaping gases. The collector 44 (in a particular, non-limiting embodiment) comprises a U-shaped annular wall which is located between the lower frame 15 and the holding part 16. On its external side, the wall extends upwardly beyond the level of the openings 61 (in a particular, non-limiting embodiment) to form a wall of impact for the centrifuged liquid coming out of the capsule 17. The collector 44 further extends on an angular portion of the wall by a beverage outlet 46. Such outlet 46 traverses an opening 47 provided into the lower frame 15. Therefore, during the centrifugation, the beverage is collected in the collector 44 and drained through the outlet 46 to fill a receptacle (e.g., a cup) placed beneath the outlet 46.

According to a general aspect of the presently disclosed and/or claimed inventive concept(s), the liquid interfacing part 8 and the holding part 16, which are both rotating parts of the device 1, are connected together by connection means at least during centrifugation, i.e. during rotation of the parts 8, 16. As will be more particularly discussed hereinafter, the connection means comprises at least one locking means being (pivotably) moveable outwardly under the effect of centrifugation and (in a particular, non-limiting embodiment) a lever effect and thereby can increase the engagement forces of the connection means under such conditions.

Figure 4:
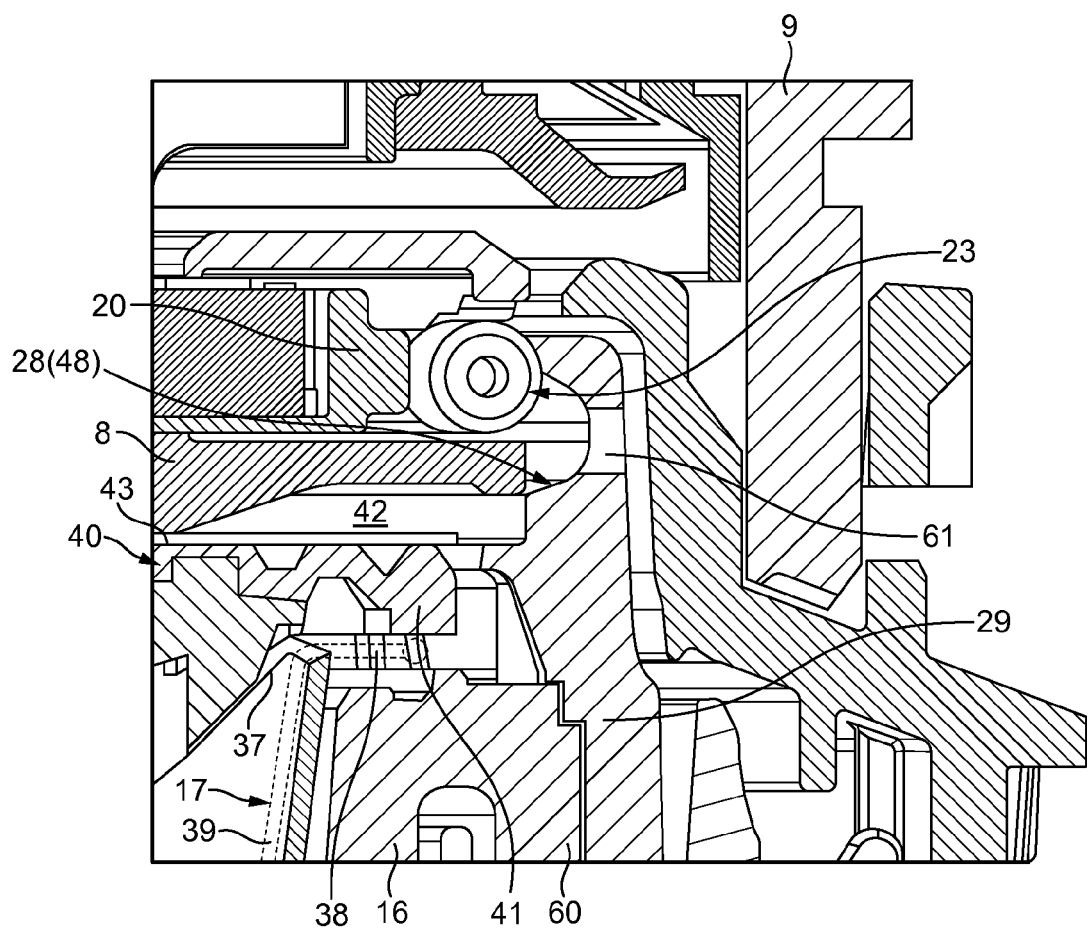
FIG. 4 shows a cross sectional partial view of the device of FIG. 1.
Figure 5A:
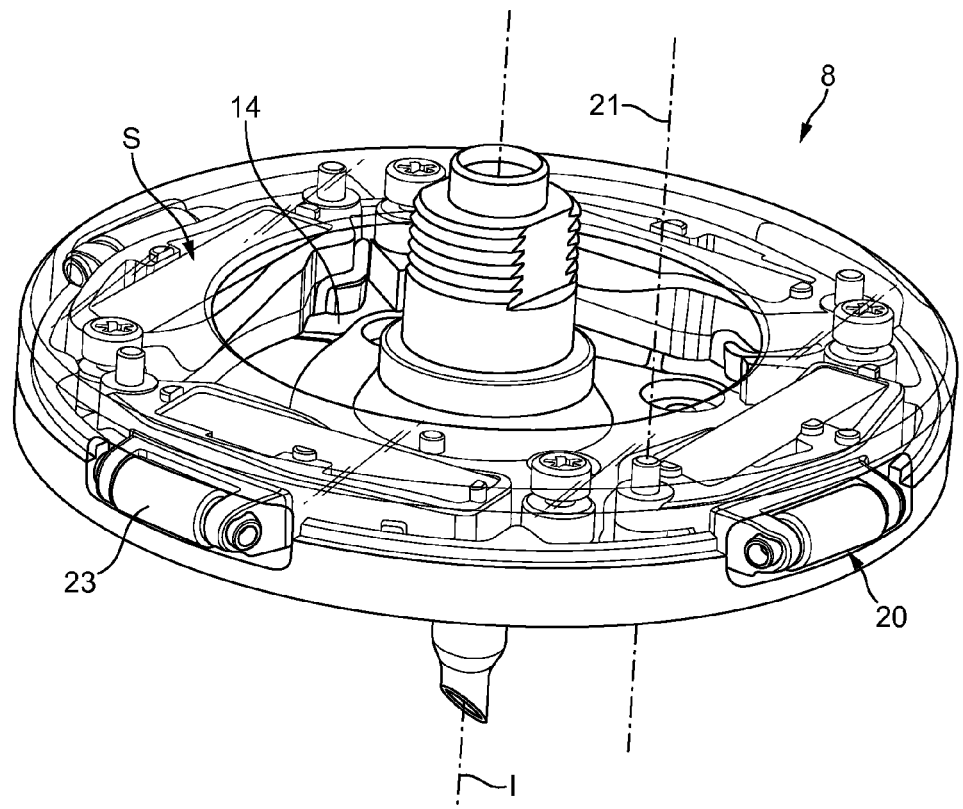
FIG. 5a shows a perspective view of a liquid interfacing part of the device of FIG. 1.
Figure 5B:
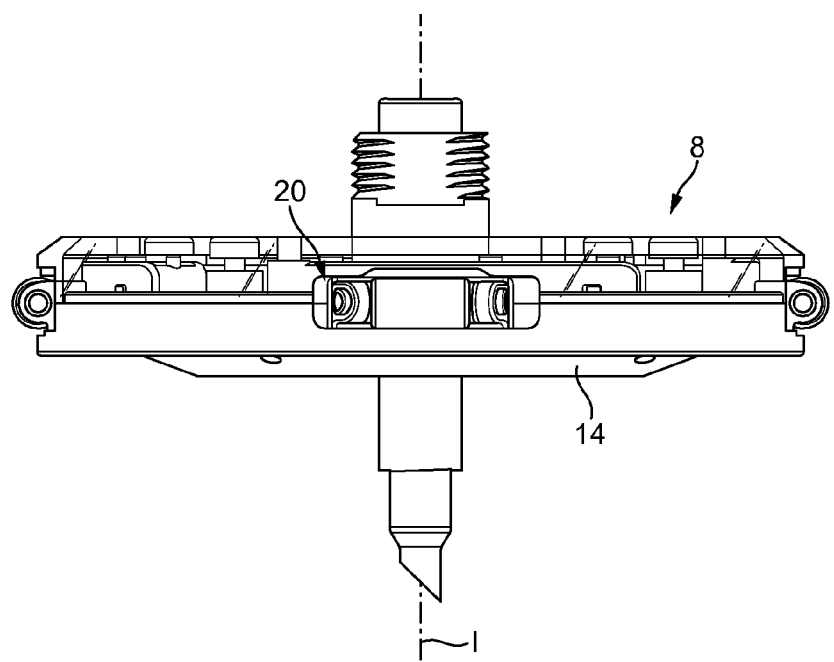
Figure 5C:
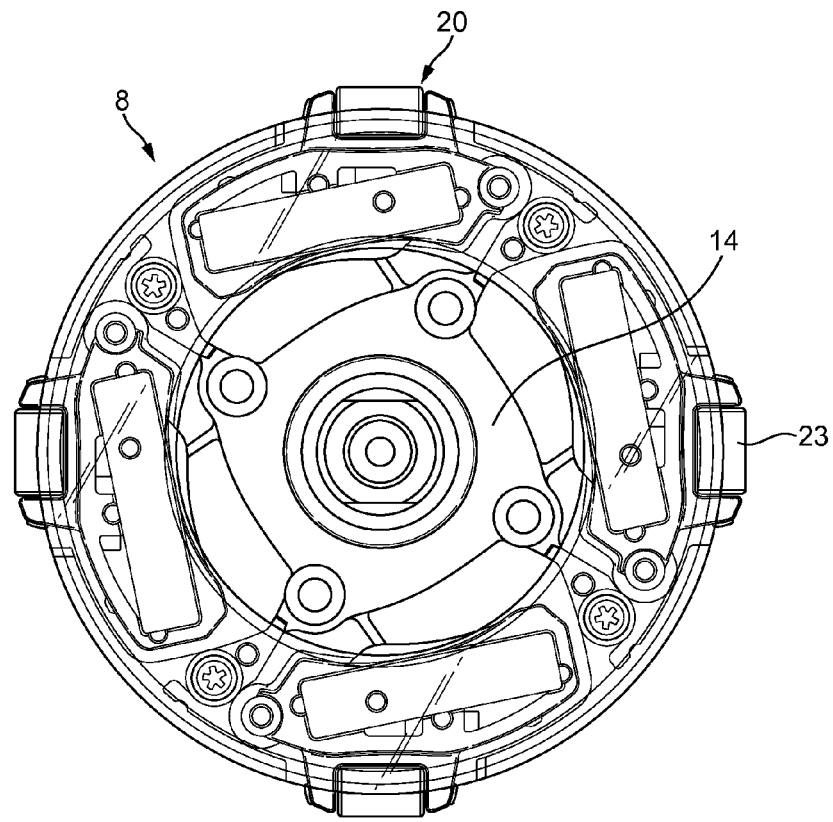
Figure 6:
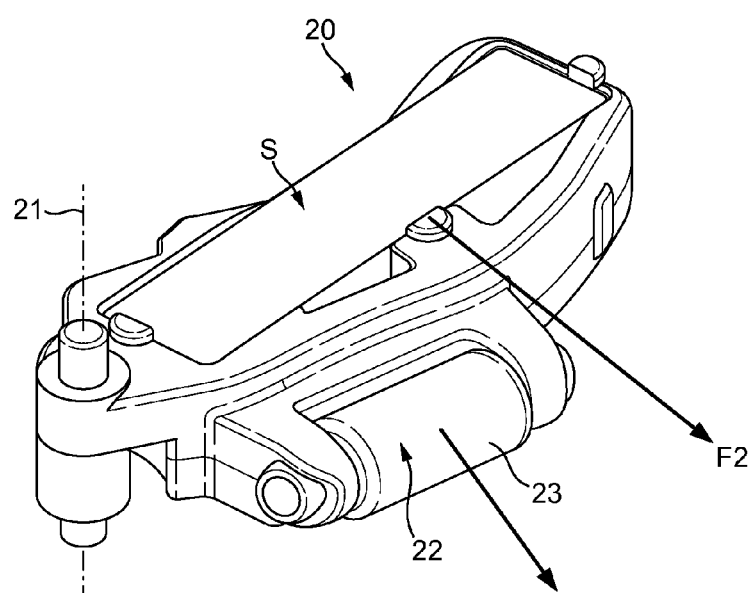
FIG. 6 shows a locking means of the device of FIG. 1.

In the illustrated mode of the presently disclosed and/or claimed inventive concept(s), the device 1 comprises a series of locking means 20, each one delimiting an engaging surface 23, such as a surface of rounded shape. More precisely, in a particular, non-limiting embodiment, four locking means 20 are distributed on the periphery of one of the parts 8, 16 at 90 degree in the illustrated mode (cf. FIGS. 5a and 5c). The locking means 20 are (in a particular, non-limiting embodiment) arranged on the respective part 8, 16 to be moveably connected thereto with at least one degree of freedom (in a particular, non-limiting embodiment) at least about a pivoting axis 21. The pivoting axis 21 is (in a particular, non-limiting embodiment) oriented in parallel to the longitudinal axis of rotation "I". An elastic means (not shown) can be inserted between the locking means 20 and a corresponding part—e.g. the base part 14—of the respective part 8, 16 to which the locking means 20 are connected such that the locking means 20 becomes elastically biased outwardly with respect to the longitudinal axis of rotation "I" when it is urged to rotate inwardly during a closing operation of the brewing unit 2. However, as will be described in detail herein, the biasing force of the spring must be so small that the liquid interfacing part 8 can be lifted from the holding part 16 during a supply of liquid (e.g. water) into the receptacle 17 due to an increased pressure within the receptacle 17 to thus allow for an escape of gases initially trapped in the receptacle 17. According to a particular, non-limiting embodiment, the locking means 20 are not provided with any biasing means so that the openings 61 are open when closing the device 1 and before rotating the device 1. In both cases, the gases can escape via the valve means 40 and the discharge openings 61 at least when supplying liquid/water in the receptacle 17 and before starting centrifugation thus allowing a suitable amount of liquid to enter the capsule 17 for a sufficient interaction with the beverage ingredients. The valve means (in a particular, non-limiting embodiment) comprises a radial groove or channel of controlled dimension (not illustrated) formed in the spring-biased pressing portion 41 to enable gas to escape towards the discharge opening 61, when the liquid interfacing part 8 is engaged with the capsule and the lower holding part 16. The radial groove can be positioned anywhere on the lower engaging surface of the portion 41 which comes in contact with the rim 38 of the capsule. It could also be envisaged to have the radial groove on the rim of the capsule. This static state (supply of water; escape of gases) is shown in FIGS. 1 and 4.

Figure 2:
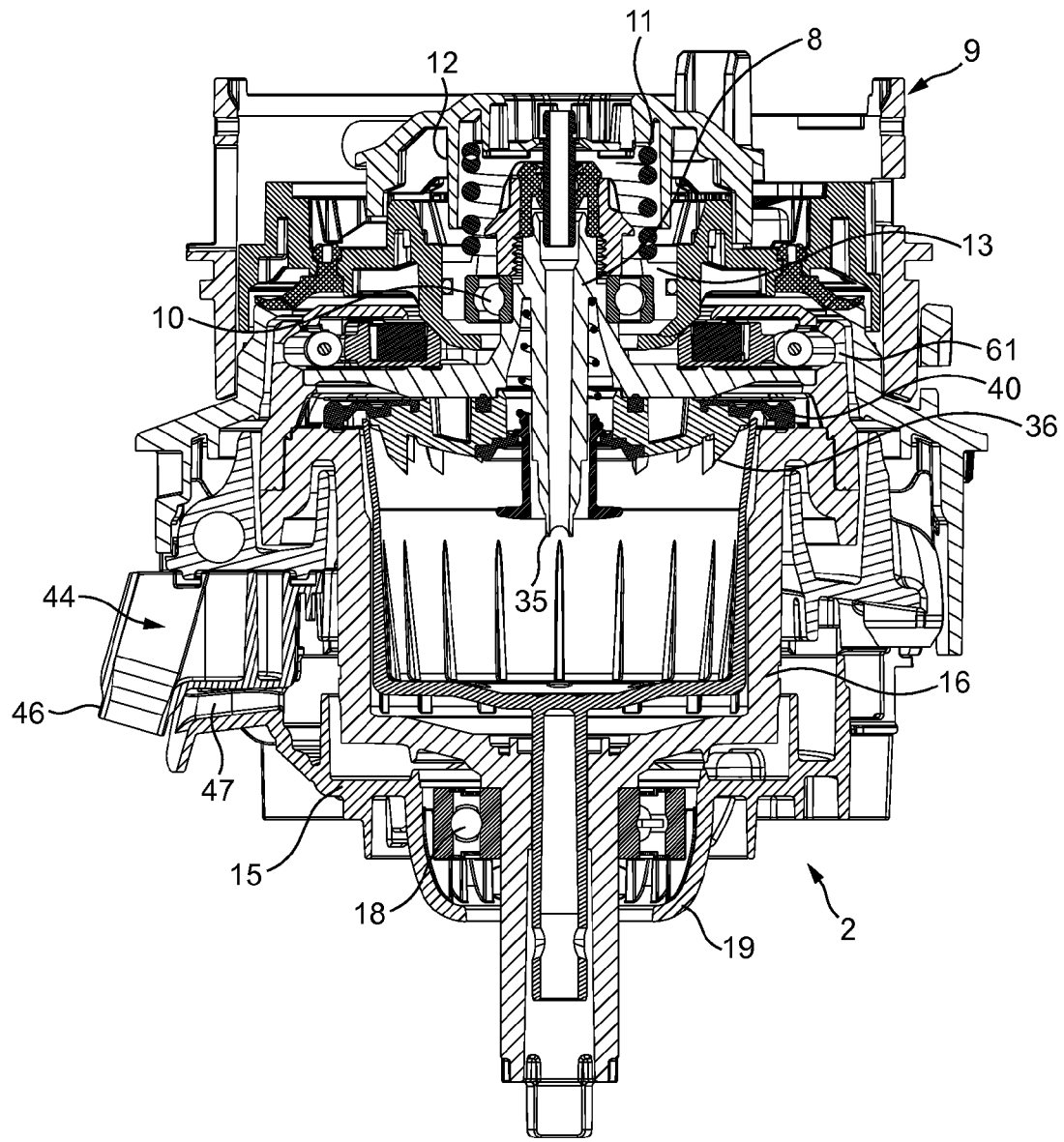
FIG. 2 shows the device of the presently disclosed and/or claimed inventive concept(s) in a closed and static state of the brewing unit.

FIG. 2 shows a static (non-rotating) state in which the device 1 is closed about the receptacle 17. FIG. 2 can be a condition after closing the parts 8, 16 and before supplying water (see FIG. 1) or can be a condition after supplying water when the gases are completely escaped from the receptacle 17 and the system is ready for the centrifugation process. In the particular embodiment of FIG. 2, the locking means 20 are not biased by a spring towards a closed or locking position. The omission of the springs thus results in a reduced number of parts and a reduction of costs.

On the inner side of the holding part 16, the holding part 16 or connection means further comprises a peripheral recess such as a (circumferential) groove 28. The groove 28 is complementary shaped and extends circumferentially in the internal (tubular) surface of the sidewall of the holding part 16 to be engaged by the plurality of locking means 20. The groove 28 is more precisely provided in the internal surface above the level of the receptacle 17 when the receptacle 17 is fitted in place in the holding part. The advantage of a continuous recess 28 is that the liquid interfacing part 8 does not necessarily require a specific orientation during the connecting operation. The discharge openings 61 are (in a particular, non-limiting embodiment) provided in said groove 28 as through holes.

Figure 3:
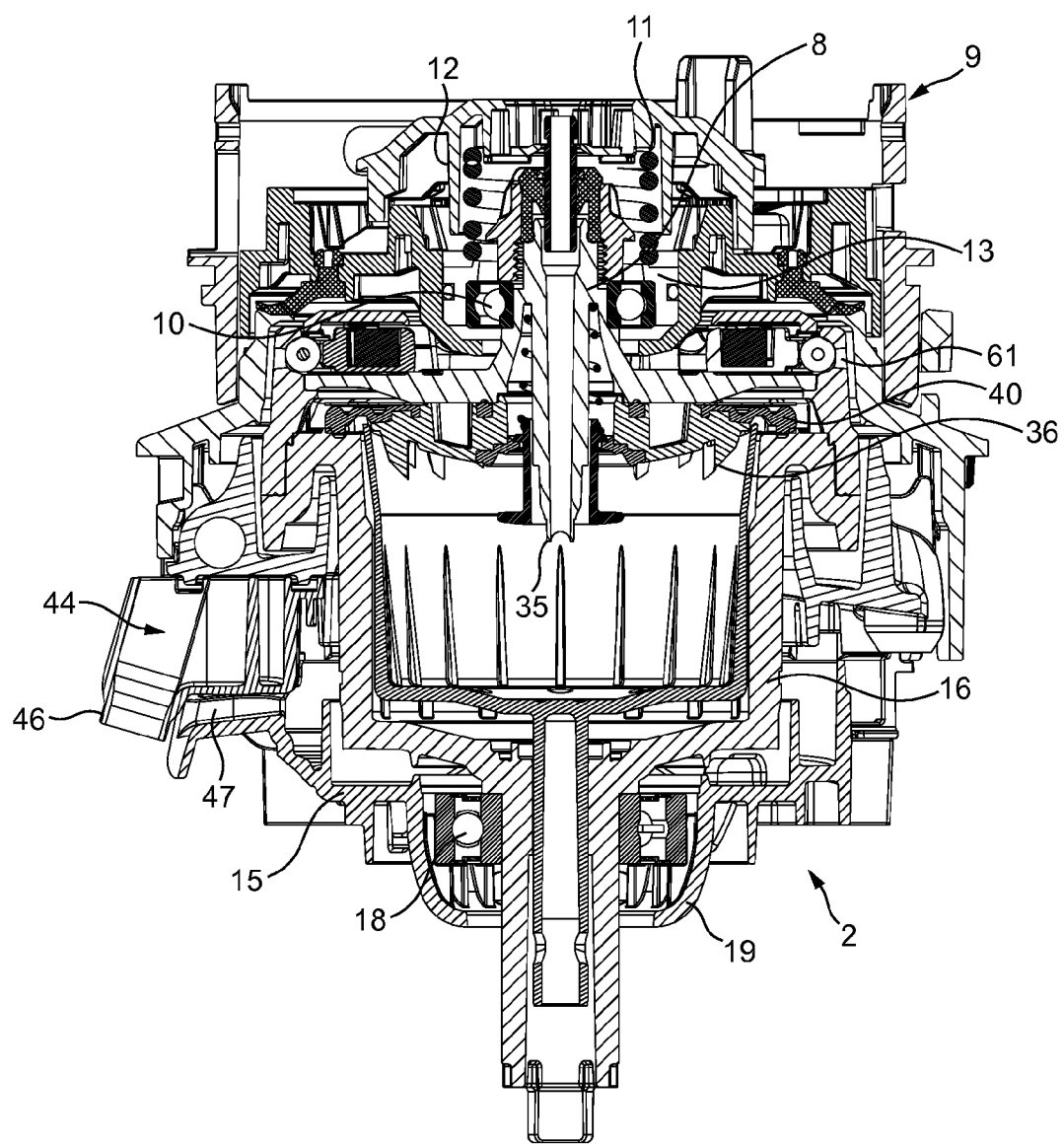
FIG. 3 shows the device of the presently disclosed and/or claimed inventive concept(s) in a closed and rotating state of the brewing unit.

FIG. 3 shows the device 1 or better the centrifugal brewing unit 2 in the brewing conditions when the liquid interfacing part 8 is connected to the holding part 16 by means of the locking means 20 which are engaged in the groove 28 of the holding part 16. A concave retaining surface 48 of the groove 28 is provided that engages with the complementary convex surface 23 of the locking means 20. The curved retaining surface 48 of the groove 28 extends upwardly and inwardly and is engaged in the complementary curved surface 23 of the locking means 20. In the brewing or centrifugation or rotation conditions, the capsule 17 is driven in rotation by the two parts 8, 16 then closed by the locking means 20 due to centrifugal forces. The surface 48 (herein also referred to as first engaging surface) of one of the holding part 16 or the liquid interfacing part 8 as well as the surface 23 (herein also referred to as second engaging surface) of the locking means connected to the other one of these parts 8, 16 form the connection means.

A dynamic hydraulic pressure is created in the capsule 17, such pressure increasing progressively from the central axis I towards the periphery. This hydraulic pressure reaches a maximum value at the most peripheral point of the capsule 17. The pressure is exerted on the liquid interfacing part 8 in the axial direction to open the valve means 40 which provides the restricted flow path for the centrifuged beverage. For example, the valve means 40 opens when a pressure threshold is reached upstream of the valve means 40, for example, of several bars. Opening is carried out by the tongue 41 deflecting upwardly as previously mentioned. These axial forces thus act onto the liquid interfacing part 8 to separate the same from the holding part 16. However, the higher the rotational speed of the device 1 is, the more are the locking means 20 engaged with the respective groove 28, and the resulting engagement forces thus increase between the two engaging surfaces 23, 48 as a result of the centrifugal forces. The engagement forces can be even further increased by applying additional mass elements S on the locking means 20 thus increasing—due to the lever effect—the centrifugal mass. The mass elements S can be removably provided on the locking means 20. Hence, when the axial forces are applied to tend to separate the two parts 8, 16, the first and second engaging surfaces 23, 48 cooperate in engagement to resist such separation. Hence, even if the first and second engaging surfaces 23, 48 are not necessarily engaged in a static state of the device at least when supplying water in the receptacle, they are (adapted to be) engaged in contact together at least during rotation of the device 1 in a manner preventing the holding part 16 and the liquid interfacing part 8 from moving away from each other, at least in the axial direction of rotation I.

In order for the valve means 40 to work correctly during centrifugation, the connection obtained by the locking means 20 must resist to the dynamic hydraulic pressure. In particular, the centrifugal forces F1 of the roller, and in a particular, non-limiting embodiment, plus the centrifugal forces F2 of the mass element, created by the rotation generates dynamic closing forces oriented axially as resulting from the mass of the locking means 20 which is submitted to the centrifugal forces. As a result of these forces and the orientation of the engaging surfaces 23, 48, the engagement forces increase considerably when increasing the rotational speed of the device 1.

It has already been mentioned that the second engaging surface 23 is (in a particular, non-limiting embodiment) laid out as a convex surface. In a particular, non-limiting embodiment, the second engaging surface is thus provided by a rotatably mounted member, for example (but not by way of limitation) a roller 22, which (in a particular, non-limiting embodiment) has a rotational axis being orthogonally arranged with respect to the longitudinal axis of rotation. Hence, the roller can be easily rolled into the complementary concave first engaging surface 48 thus reducing the frictional forces and wear of the interrelated features.

The actuation of the initial closure of the liquid interfacing part 8 with the holding part 16 can be carried out by the closure actuation mechanism 45 acting, for instance, onto the upper frame as shown in FIG. 1. The closure mechanism 45 can be a cam system as represented, or a rotary bayonet-like closure system or a knee-joint means or an hydraulic means or a motorized spindle-type mechanism a combination of these systems. In particular, a suitable closure system is described in co-pending European patent application No.

12194801.2. Of course, this closure mechanism 45 can also be associated to the lower frame 15 or to both frames 9, 15 for a relative closure movement between the parts.

A lower bearing connection of the device 1 can be designed such that a self-alignment of the holding part 16 with the liquid interfacing part 8 can be ensured. In its general principle, the rotational axle 70 of the holding part 16 is spring-biased in the radial direction but stiff in the axial direction "I". In this particular mode, the axle 70 is fixed to the bearing 18 but the bearing 18 is linked to the housing 19 of the lower frame portion by a series of helical leaf springs. This self-aligning arrangement also reduces the vibrations during the centrifugation. Of course, the elastic means can be replaced by any equivalent means providing a resilient displacement in the radial direction such as a rubber element, for instance. Also, this self-alignment system can be placed on the upper bearing assembly as well.

In the following, a method for preparing a beverage from a beverage ingredient contained in a receptacle 17 is described.

In a first step, the receptacle 17 is provided and placed in the holding part 16. Then, the liquid interfacing part 8 is engaged against the receptacle 17. In this condition, the locking means 20 is (in a particular, non-limiting embodiment) not—but can be—biased to engage the respective first engaging surface 48. In a next step of the method, liquid (for example, but not by way of limitation, water) is supplied in the receptacle 17 by means of the liquid interfacing part 8. During said method step, the first engaging surface 48 and the second engaging surface 23 are (in a particular, non-limiting embodiment) not engaged in said static state of the device 1 so that gases in the receptacle 17 can escape via the discharge opening(s) provided in the device, for example (but not by way of limitation) in the first engaging surface 48. This comes about since the supply of water in the receptacle 17 (in a particular, non-limiting embodiment) results in an increase of pressure in the receptacle 17 thus lifting the liquid interfacing part 8 from the holding part 16 due to the increasing pressure in the receptacle 17 to provide a discharge passage for the gases between the receptacle 17 and the discharge opening(s) 61.

In a next step of the method, the receptacle is driven in rotation along a longitudinal axis of rotation I by rotating the holding part 16 and the liquid interfacing part 8 together with the receptacle 17. During said centrifugation step, the holding part 16 and the liquid interfacing part 8 are connected together by connection means at least during rotation in such a manner that these parts 8, 16 rotate together with the receptacle 17. This comes about since the at least first engaging surface 48 of one of the holding part 16 or the liquid interfacing part 8 and the second engaging surface 23 of a locking means 20 connected to the other one of the holding part 16 or the liquid interfacing part 8 engage in contact together at least during said rotation step in a manner preventing the holding part 16 and the liquid interfacing part 8 from moving away from each other, at least in the axial direction of rotation I. As the locking means 20 of the connection means is arranged to be moveably connected to the other one of the parts 8, 16 with at least one degree of freedom—at least about a pivoting axis (in a particular, non-limiting embodiment) being substantially in parallel to the longitudinal axis of rotation I—the engagement forces between the two engaging surfaces increase as a result of the increase of the centrifugal forces.

In a final step, the beverage obtained by the interaction between the ingredient and water in the receptacle 17 and which is centrifuged out of the receptacle 17 is collected by a collecting part (44) and can be dispensed via a beverage outlet 46.

The locking principle of the presently disclosed and/or claimed inventive concept(s) may take different designs without departing from the scope of the presently disclosed and/or claimed inventive concept(s). Hence, the locking means 20 can be provided on the holding part 16 or the liquid interfacing part 8 wherein the first engaging surface is then provided on the corresponding other of these parts 8, 16. Due to the lever effect, it is to be understood that the locking means 20 or better its second engaging surface is provided closer to the axis of rotation I in a radial direction compared to the first engaging surface. As an alternative to the roller layout, the second engaging surface 23 can also be formed by another rotationally symmetric or spherical layout of the respective member.

The invention claimed is:

1. A device for preparing a beverage from a beverage ingredient contained in a receptacle by driving the receptacle in centrifugation comprising:
    a receptacle holder arranged for holding the receptacle in a position enabling it to be driven in rotation along a longitudinal axis of rotation, the receptacle holder comprising a support portion and a side wall extending from the support portion,
    a liquid interface arranged for engaging against the receptacle and for supplying water in the receptacle and/or extracting the beverage from the receptacle, wherein the liquid interface comprises a base for engaging the receptacle and an injector for supplying liquid to the receptacle,
    a collector for collecting the beverage obtained by the interaction between the ingredient and water in the receptacle,
    wherein the receptacle holder and the liquid interface are connected together at least during rotation in such a manner that these parts rotate together with the receptacle during centrifugation, and wherein the receptacle holder and liquid interface are connected via at least a first engaging surface of one of the receptacle holder or the liquid interface and a second engaging surface connected to the other one of the receptacle holder or the liquid interface, wherein the first and second engaging surfaces are adapted to be engaged in contact together at least during rotation of the device in a manner preventing the receptacle holder and the liquid interface from moving away from each other, at least in the axial direction of rotation, and
    wherein the second engaging surface is arranged to be moveably connected to the other one of the parts with at least one degree of freedom at least about a pivoting axis to allow engagement forces between the two engaging surfaces to increase as a result of the increase of the centrifugal forces.

2. The device according to claim 1, wherein a discharge opening is provided in the device for allowing gases in the receptacle to escape through said opening when supplying water in the receptacle, and wherein the first engaging surface and the second engaging surface are not engaged in a static state of the device at least when supplying water in the receptacle before the rotation of the parts during the extraction of the beverage.

3. The device according to claim 1, wherein the second engaging surface is arranged to be moveably connected to the first engaging surface with at least one degree of freedom at least about a pivoting axis being substantially in parallel to the longitudinal axis of rotation.

4. The device according to claim 1, wherein a mass element is removably provided on the second engaging surface for increasing the centrifugal forces.

5. The device according to claim 1, wherein the engaging surfaces of the two parts of the device are such that they extend at least in a direction of the parts which is inclined or curved relative to the axial direction of rotation.

6. The device according to claim 1, wherein the second engaging surface is provided by a rotatably mounted member which has a rotational axis being orthogonally arranged with respect to the longitudinal axis of rotation.

7. The device according to claim 1, wherein the first engaging surface is a circumferential groove in the respective one of the receptacle holder or the liquid interface, with which the second engaging surface engages at least during centrifugation.

8. The device according to claim 2, wherein the discharge openings are radial through-openings which are provided in the first engaging surface.

9. The device according to claim 1, wherein the injector of the liquid interface injects liquid in the centre of the receptacle.

10. The device according to claim 1, wherein the liquid interface further comprises a series of perforating members for perforating outlet openings in an upper wall and/or sidewall of the receptacle to thereby extract the beverage from the receptacle.

11. The device according to claim 1, further comprising a flow restriction valve comprising a pressing portion engaging with a rim portion of the receptacle, wherein the pressing portion of the valve engages with a rim portion of the receptacle under the load of an elastic biasing means, wherein during centrifugation, the pressing portion is moved away from the rim portion by the pressure of the centrifuged beverage so as to create at least one flow passage between the pressing portion and the rim portion of the receptacle.

12. The device according to claim 1, wherein the first and/or second engaging surface is located above the receptacle.

13. The device according to claim 1, wherein the device further comprises discharge openings for the beverage escaping the receptacle, wherein the discharge openings for the liquid and the discharge openings for the gases are identical.

14. A method for preparing a beverage from a beverage ingredient contained in a receptacle, comprising the steps of:

placing the receptacle in a receptacle holder, wherein the receptacle holder comprises a support portion and a side wall extending from the support portion, engaging a liquid interface against the receptacle, wherein the liquid interface comprises a base for engaging the receptacle and an injector for supplying liquid to the receptacle, supplying water in the receptacle through the injector of the liquid interface, driving the receptacle in rotation along a longitudinal axis of rotation by rotating the receptacle holder and the liquid interface together with the receptacle, collecting the beverage obtained by the interaction between the ingredient and water in the receptacle by a collector, wherein the receptacle holder and the liquid interface are connected together at least during rotation in such a manner that these parts rotate together with the receptacle during centrifugation, wherein the receptacle holder and the liquid interface are connected via at least a first engaging surface of one of the receptacle holder or the liquid interface and a second engaging surface connected to the other one of the receptacle holder or the liquid interface, wherein the first and second engaging surfaces engage in contact together at least during rotation of the device in a manner preventing the receptacle holder and the liquid interface from moving away from each other, at least in the axial direction of rotation, and wherein the second engaging surface is arranged to be moveably connected to the other one of the parts with at least one degree of freedom at least about a pivoting axis being substantially in parallel to the longitudinal axis of rotation to increase the engagement forces between the two engaging surfaces as a result of the increase of the centrifugal forces.

15. The method according to claim 14, wherein, during the step of supplying water in the receptacle, the first engaging surface and the second engaging surface are not engaged in said static state of the device and gases in the receptacle escape via a discharge opening provided in the device, wherein the supply of water in the receptacle results in an increase of pressure in the receptacle thus lifting the liquid interface from the receptacle holder to provide a discharge passage for the gases between the receptacle and the discharge opening.

* * * * *